US008489361B2

(12) United States Patent
Umehara

(10) Patent No.: US 8,489,361 B2
(45) Date of Patent: Jul. 16, 2013

(54) EXHAUST GAS SENSOR DIAGNOSTIC DEVICE

(75) Inventor: Akira Umehara, Kariya (JP)

(73) Assignee: Denso Corporation, Kariya (JP)

( * ) Notice: Subject to any disclaimer, the term of this patent is extended or adjusted under 35 U.S.C. 154(b) by 483 days.

(21) Appl. No.: 12/789,723

(22) Filed: May 28, 2010

(65) Prior Publication Data

US 2010/0300179 A1 Dec. 2, 2010

(30) Foreign Application Priority Data

May 29, 2009 (JP) ................................ 2009-130371

(51) Int. Cl.
*G06F 11/30* (2006.01)
*G21C 17/00* (2006.01)
*G01N 31/00* (2006.01)

(52) U.S. Cl.
USPC ........................................... 702/183; 702/31

(58) Field of Classification Search
USPC .................................................. 702/31, 183
See application file for complete search history.

(56) References Cited

U.S. PATENT DOCUMENTS

| | | | | |
|---|---|---|---|---|
| 7,472,689 | B2 * | 1/2009 | Ishizuka et al. | 123/446 |
| 8,240,188 | B2 * | 8/2012 | Umehara | 73/23.32 |
| 2003/0154709 | A1 * | 8/2003 | Kadowaki et al. | 60/276 |
| 2004/0221641 | A1 * | 11/2004 | Moritsugu et al. | 73/23.31 |
| 2005/0155405 | A1 * | 7/2005 | Sasaki et al. | 73/1.06 |
| 2009/0229355 | A1 * | 9/2009 | Shoda | 73/114.71 |
| 2010/0024520 | A1 * | 2/2010 | Sawada et al. | 73/23.31 |

FOREIGN PATENT DOCUMENTS

| | | | |
|---|---|---|---|
| JP | 54089215 | * | 7/1979 |
| JP | 9-88689 | | 3/1997 |
| JP | 2007-309103 | | 11/2007 |
| JP | 2009-134039 | | 6/2009 |

OTHER PUBLICATIONS

English Abstract of JP 54089215, Jul. 1979.*
U.S. Appl. No. 12/836,850, Umehara, filed Jul. 15, 2010.
Japanese Office Action dated May 10, 2011 issued in corresponding Japanese Application No. 2009-130371 with English Translation.

* cited by examiner

*Primary Examiner* — Michael Nghiem
(74) *Attorney, Agent, or Firm* — Nixon & Vanderhye PC

(57) ABSTRACT

In a transient state caused by fuel cut, a normal output of an A/F sensor having normal response and a lowered output having response lowered by a predetermined value as compared to the normal output are estimated, and an actual output of the A/F sensor is sensed. S1 as an integration value of a deviation between the normal output and the lowered output and S2 as an integration value of a deviation between the normal output and the actual output are calculated respectively until the normal output and the lowered output converge to an oxygen concentration equivalent to an atmosphere. S2 changes in accordance with a lowering degree of the response of the actual output. Therefore, the lowering degree of the response of the A/F sensor can be diagnosed based on S2/S1.

15 Claims, 9 Drawing Sheets

EXHAUST GAS SENSOR DIAGNOSTIC DEVICE

CROSS REFERENCE TO RELATED APPLICATION

This application is based on and incorporates herein by reference Japanese Patent Application No. 2009-130371 filed on May 29, 2009.

BACKGROUND OF THE INVENTION

1. Field of the Invention

The present invention relates to an exhaust gas sensor diagnostic device that diagnoses response of an exhaust gas sensor, which is provided to an exhaust gas flow passage of an internal combustion engine and which senses a gas state in the exhaust gas flow passage.

2. Description of Related Art

Conventionally, exhaust gas sensors such as an A/F (air-fuel ratio) sensor, a NOx (nitrogen oxide) sensor, a PM (particulate matter) sensor and an exhaust gas temperature sensor have been known as exhaust gas sensors provided to an exhaust gas flow passage of an internal combustion engine for sensing a gas state in the exhaust gas flow passage. An engine ECU (electronic control unit) controls fuel injection quantity and EGR (exhaust gas recirculation) gas quantity based on outputs of the exhaust gas sensors and controls an engine operation state into a suitable state.

There is a case where response of the output of the exhaust gas sensor lowers as compared to the normal exhaust gas sensor when at least a part of vent holes of a sensor cover (which prevents sensor element from getting wet from water) of the exhaust gas sensor is blocked by the particulate matters or when a sensor element of the exhaust gas sensor degrades, for example.

Delay in the response of the exhaust gas sensor is not problematic when the engine operation state is constant and the output of the exhaust gas sensor does not change. However, when the engine operation state shifts from a steady state to a transient state or from the transient state to the steady state, the engine operation state sensed from the output of the exhaust gas sensor having the lowered response delays from a state sensed with the normal exhaust gas sensor.

In this case, if an actual output of the exhaust gas sensor is corrected based on a deviation between an estimated output of the exhaust gas sensor estimated from the engine operation state and the actual output of the exhaust gas sensor without taking the lowering of the response of the exhaust gas sensor into account, there is a possibility that erroneous correction is performed.

There is a possibility that deterioration of emission and increase of a combustion noise are incurred if the fuel injection quantity, the EGR gas quantity and the like are controlled based on a deviation between the state of the exhaust gas, which is obtained from the output of the exhaust gas sensor having the lowered response or from the erroneously-corrected output of the exhaust gas sensor, and a target state of the exhaust gas.

Therefore, for example, a technology described in Patent document 1 (JP-A-2007-309103) estimates an output value of an oxygen concentration sensor (as exhaust gas sensor) at the time when response of the oxygen concentration sensor has lowered. The technology determines the lowering of the response of the oxygen concentration sensor by comparing the lowered estimate (i.e., estimate corresponding to lowered response) with an actual output value.

The technology of Patent document 1 can determine a magnitude relationship between the lowered estimate and the actual output value of the oxygen concentration sensor by comparing the lowered estimate and the actual output value of the oxygen concentration sensor. That is, the technology can determine whether actual response of the oxygen concentration sensor is higher or lower than the lowered estimate by comparing the lowered estimate and the actual output value of the oxygen concentration sensor. However, the technology cannot diagnose whether the response of the oxygen concentration sensor has lowered significantly or slightly. That is, the technology cannot diagnose a lowering degree of the response.

SUMMARY OF THE INVENTION

It is an object of the present invention to provide an exhaust gas sensor diagnostic device that diagnoses a lowering degree of response of an exhaust gas sensor.

According to a first example aspect of the present invention, a normal output estimating section estimates a normal output of an exhaust gas sensor having normal response based on an operation state of an internal combustion engine. A lowered output estimating section estimates a lowered output of the exhaust gas sensor having the response lowered by a predetermined value as compared to the normal exhaust gas sensor. An actual output sensing section senses an actual output of the exhaust gas sensor. A diagnosing section diagnoses the response of the exhaust gas sensor based on the normal output estimated by the normal output estimating section, the lowered output estimated by the lowered output estimating section and the actual output sensed by the actual output sensing section.

In this way, the actual output of the exhaust gas sensor can be compared with the two outputs having the different responses, i.e., the normal output and the lowered output. Accordingly, the lowering degree of the response of the exhaust gas sensor can be diagnosed differently from the case where the actual output of the exhaust gas sensor is compared with either one of the normal output and the lowered output. As a result, suitable processing can be performed based on the lowering degree of the response of the exhaust gas sensor. For example, processing for correcting the actual output when the lowering degree is small and for prohibiting the engine control based on the actual output of the exhaust gas sensor when the lowering degree is large can be performed.

Instead of using the fixed value, the normal output of the exhaust gas sensor having the normal response is estimated based on the operation state of the internal combustion engine, and the lowered output of the exhaust gas sensor having the response lowered by the predetermined value as compared to the normal exhaust gas sensor is estimated. Therefore, the normal output and the lowered output of the exhaust gas sensor can be estimated in consideration of the response of the exhaust gas sensor that changes in accordance with the operation state of the internal combustion engine. Thus, the response of the exhaust gas sensor can be diagnosed with high accuracy in accordance with the operation state of the internal combustion engine.

According to a second example aspect of the present invention, the normal output estimating section estimates the normal output based on a gas state in a cylinder estimated from the operation state of the internal combustion engine, time necessary for the exhaust gas to reach from the cylinder to the exhaust gas sensor and a response characteristic of the normal exhaust gas sensor.

The time necessary for the exhaust gas to reach from the cylinder to the exhaust gas sensor and the response characteristic of the normal exhaust gas sensor change in accordance with flow velocity of the exhaust gas. Therefore, the normal output can be estimated with high accuracy in consideration of the flow velocity of the exhaust gas by using the time necessary for the exhaust gas to reach from the cylinder to the exhaust gas sensor and the response characteristic of the normal exhaust gas sensor as the parameters when the normal output is estimated.

According to a third example aspect of the present invention, the normal output estimating section estimates the normal output based on parameters including at least a response characteristic of the normal exhaust gas sensor. The lowered output estimating section estimates the lowered output based on the parameters, which are the same as the parameters in the case of the estimation of the normal output and which include at least a response characteristic of the exhaust gas sensor having the response lowered by the predetermined value as compared to the response characteristic of the normal exhaust gas sensor in place of the response characteristic of the normal exhaust gas sensor.

The lowered output is estimated using the same parameters as the case of the estimation of the normal output except the response characteristic. Therefore, the lowered output can be estimated easily.

According to a fourth example aspect of the present invention, the lowered output estimating section estimates the lowered output by applying first-order lag processing to the normal output estimated by the normal output estimating section.

Thus, the lowered output can be easily estimated by applying the first-order processing to the normal output.

According to a fifth example aspect of the present invention, an integrating section calculates S1, which represents an integration value of a deviation between the normal output and the lowered output, and S2, which represents an integration value of a deviation between the actual output and the normal output or the lowered output. The diagnosing section diagnoses the response of the exhaust gas sensor based on S1 and S2.

Thus, even if output variation occurs in the normal output, the lowered output and the actual output due to the noise and the like, the influence of the output variation on the integration values can be reduced by integrating the deviations. Therefore, the response of the exhaust gas sensor can be diagnosed with high accuracy based on the integration values S1, S2.

According to a sixth example aspect of the present invention, the integrating section ends the calculation of S1 and S2 when the normal output, the lowered output and the actual output change after the calculation of S1 and S2 is started and at least one of the lowered output and the normal output converges thereafter.

Thus, even in the case where the response of the exhaust gas sensor lowers significantly and it takes a long time until the actual output converges, the calculation of S1 and S2 is ended when at least one of the normal output and the lowered output converges. Therefore, unnecessary lengthening of the integration time can be prevented.

According to a seventh example aspect of the present invention, the integrating section starts the calculation of S1 and S2 when the normal output, the lowered output and the actual output are equal to each other.

Thus, the calculation of S1 and S2 is started when the normal output, the lowered output and the actual output are equal to each other. Therefore, the calculation errors of the integration values S1, S2 can be reduced.

If the operation state of the internal combustion engine shifts from the steady state to the transient state, at least one of the normal output, the lowered output and the actual output changes in the exhaust gas sensor in retard of the shift within a predetermined time of delay.

Therefore, according to an eighth example aspect of the present invention, the integrating section starts the calculation of S1 and S2 when the operation state of the internal combustion engine shifts from a steady state to a transient state.

Thus, the time of the execution of the integration in the steady state, in which the normal output, the lowered output and the actual output do not change, before the operation state of the internal combustion engine shifts from the steady state to the transient state can be shortened as much as possible.

If the time since the operation state of the internal combustion engine shifts to the transient state until at least one of the lowered output and the normal output converges lengthens, the time of the calculation of the integration values S1, S2 in the state where the noise arises in the normal output, the lowered output and the actual output lengthens. Therefore, errors tend to occur in the integration values S1, S2. If the lowering degree of the response of the exhaust gas sensor is diagnosed based on the integration values S1, S2 in such the state, there is a possibility that the lowering degree of the response of the exhaust gas sensor is diagnosed erroneously.

Therefore, according to a ninth example aspect of the present invention, the integrating section calculates S1 and S2 since the operation state of the internal combustion engine shifts from a steady state to a transient state until at least one of the lowered output and the normal output converges. The diagnosing section stops the diagnosis of the response of the exhaust gas sensor if the time since the operation state of the internal combustion engine shifts from the steady state to the transient state until at least one of the lowered output and the normal output converges exceeds a predetermined time.

Thus, the calculation of the integration values S1, S2 over the predetermined time in the state where the noise arises in the normal output, the lowered output and the actual output can be prevented. Therefore, the diagnosis of the lowering degree of the response of the exhaust gas sensor based on the integration values S1, S2 containing the errors can be prevented. As a result, erroneous diagnosis of the response of the exhaust gas sensor can be prevented.

According to a tenth example aspect of the present invention, the integrating section calculates S1 and S2 since the operation state of the internal combustion engine shifts from the steady state to the transient state until at least one of the lowered output and the normal output converges. The diagnosing section stops the diagnosis of the response of the exhaust gas sensor when a change amount of the converged one of the lowered output and the normal output, the change amount occurring in the period since the operation state of the internal combustion engine shifts from the steady state to the transient state until at least one of the lowered output and the normal output converges, is smaller than a predetermined amount.

Thus, the diagnosis of the response of the exhaust gas sensor based on the integration values S1, S2 in the state where the integration values S1, S2 are small and are susceptible to the measurement error because the change amounts of the lowered output and the normal output are small is prevented. As a result, erroneous diagnosis of the lowering degree of the response of the exhaust gas sensor can be prevented.

If the response of the exhaust gas sensor changes, the change rate of the output of the exhaust gas sensor at the same timing changes.

Therefore, according to an eleventh example aspect of the present invention, the diagnosing section diagnoses the response of the exhaust gas sensor based on the change rates of the normal output, the lowered output and the actual output at the same timing.

Thus, the lowering degree of the response of the exhaust gas sensor can be diagnosed also based on the change rates of the normal output, the lowered output and the actual output at the same timing.

If the response of the exhaust gas sensor lowers, the timing when the change rate of the output of the exhaust gas sensor is maximized changes.

Therefore, according to a twelfth example aspect of the present invention, the diagnosing section diagnoses the response of the exhaust gas sensor based on the timings at which the change rates of the normal output, the lowered output and the actual output are maximized respectively.

Thus, the lowering degree of the response of the exhaust gas sensor can be diagnosed also based on the timings when the change rates of the normal output, the lowered output and the actual output are maximized respectively.

According to a thirteenth example aspect of the present invention, the diagnosing section diagnoses the response of the exhaust gas sensor when the operation state of the internal combustion engine shifts to a fuel cut state.

If the fuel injection is cut, the gas state flowing into the cylinder, the gas state in the cylinder and the gas state discharged from the cylinder become substantially the same equivalent of the atmosphere. Furthermore, the influence of the disturbance on the operation state of the internal combustion engine is very small during the fuel cut. Therefore, the normal output and the lowered output of the exhaust gas sensor can be estimated with high accuracy. As a result, the lowering degree of the response of the exhaust gas sensor can be diagnosed with high accuracy.

According to a fourteenth example aspect of the present invention, the actual output sensing section corrects the actual output based on a gas state in a cylinder during fuel cut.

As mentioned above, if the fuel injection is cut, the gas state flowing into the cylinder, the gas state in the cylinder and the gas state discharged from the cylinder become substantially the same equivalent of the atmosphere. Therefore, the gas state at the position where the exhaust gas sensor is provided can be estimated with high accuracy based on the intake quantity, the exhaust gas temperature and the like. Therefore, when the actual output of the exhaust gas sensor is deviated from the normal value due to offset deviation or gain deviation, the actual output of the exhaust gas sensor can be corrected such that the actual output conforms to the estimated gas state with high accuracy.

If the gas state in the cylinder is the steady state and the exhaust gas sensor is normal, the estimates of the normal output and the lowered output should coincide with the sensing value of the actual output regardless of the difference in the responses.

Therefore, according to a fifteenth example aspect of the present invention, the normal output estimating section and the lowered output estimating section correct deviations of the normal output and the lowered output from the actual output when a gas state in a cylinder is a steady state.

Thus, when the estimates of the normal output and the lowered output estimated by the normal output estimating section and the lowered output estimating section respectively are deviated from the sensing value of the actual output, the normal output estimating section and the lowered output estimating section can correct the estimates of the normal output and the lowered output to the same value as the sensing value of the actual output when the gas state in the cylinder is the steady state.

According to a sixteenth example aspect of the present invention, the diagnosing section suspends the diagnosis of the response of the exhaust gas sensor since the exhaust gas sensor is warmed up until a predetermined time elapses thereafter.

Thus, the diagnosis of the response of the exhaust gas sensor in the state where the output of the exhaust gas sensor is unstable is prevented, for example, during the engine start. As a result, erroneous diagnosis of the lowering degree of the response of the exhaust gas sensor can be prevented.

Each of the functions of the sections according to the present invention may be realized using a hardware resource having functions specified by a construction thereof, a hardware resource having functions specified by a program, or a combination of such the hardware resources. The functions of the sections are not limited to the functions realized by using the hardware resources physically separate from each other.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
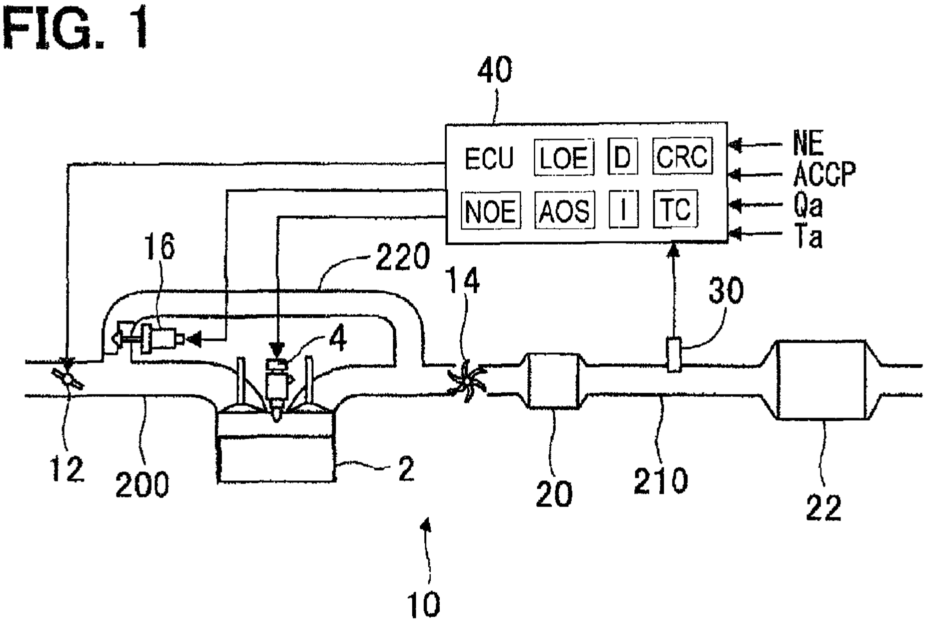
FIG. 1 is a block diagram showing an exhaust gas purification system according to an embodiment of the present invention.

Hereinafter, an embodiment of the present invention will be described with reference to the drawings. An exhaust gas purification system according to the embodiment of the present invention is shown in FIG. 1.

(Exhaust Gas Purification System 10)

The exhaust gas purification system 10 according to the present embodiment is a system that purifies exhaust gas discharged from a four-cylinder diesel engine 2 (engine).

The exhaust gas purification system 10 has a throttle valve 12, an EGR valve 16, a DOC 20 (diesel oxidation catalyst), a DPF 22 (diesel particulate filter), an A/F sensor 30, an ECU 40 and the like. Fuel accumulated in a common rail (not shown) is injected from an injector 4 into the engine 2.

A turbine 14 of a turbocharger provided to an exhaust gas flow passage 210 drives and rotates a compressor (not shown) of the turbocharger via a shaft (not shown). Intake air in an intake air flow passage 200 compressed by the compressor of the turbocharger passes through an intercooler (not shown). Then, a flow rate of the intake air is adjusted by the throttle valve 12. Then, the intake air is suctioned into each cylinder of the engine 2.

The throttle valve 12 is narrowed to increase EGR gas quantity in a light-load operation range. The throttle valve 12 is maintained at a substantially fully-opened state in a heavy-load operation range to increase intake air quantity and to reduce a pumping loss, for example. The flow rate of the intake air taken into the engine 2 is sensed with an intake quantity sensor (not shown).

The EGR valve 16 is provided in an EGR flow passage 220 connecting the intake air flow passage 200 and the exhaust gas flow passage 210 of the engine 2. The EGR valve 16 controls the EGR quantity circulated from the exhaust gas side to the intake air side.

The DOC 20 has a structure, in which an oxidation catalyst such as platinum is supported on a honeycomb structure. The DOC 20 causes an oxidation reaction of the fuel, which is added to the exhaust gas flow passage 210 by a post-injection from the injector 4. Due to reaction heat of the oxidation reaction, exhaust gas temperature in the exhaust gas flow passage 210 rises, and particulate matters collected in the DPF 22 combust. Instead of using the post-injection from the injector 4, the fuel may be added from a fuel addition valve that is provided to the exhaust gas flow passage 210 upstream of the DOC 20 and is dedicated for regeneration of the DPF 22.

The DPF 22 has a honeycomb structure, which is formed by supporting an oxidation catalyst such as the platinum on porous ceramics. Exhaust gas flow passages of the honeycomb structure of the DPF 22 formed along an exhaust gas flow direction are blocked alternately on an inlet side or an outlet side. The particulate matters in the exhaust gas flow into the DPF 22 via the exhaust flow passages, which are not blocked on the inlet side but are blocked on the outlet side. When the exhaust gas passes through partition walls of the honeycomb structure defining the exhaust gas flow passages, the particulate matters are collected by pores of the partition walls. The exhaust gas flows out of the DPF 22 via the exhaust gas flow passages, which are blocked on the inlet side but are not blocked on the outlet side.

The A/F sensor 30 is provided between the DOC 20 and the DPF 22. An oxygen concentration in the exhaust gas flow passage 210 is sensed from an output of the A/F sensor 30. The output of the A/F sensor 30 should preferably have as linear a characteristic as possible with respect to the oxygen concentration.

Figure 2A:
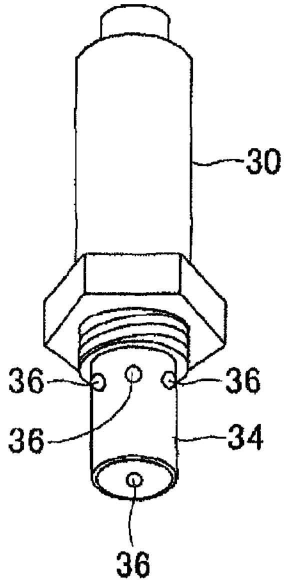
FIG. 2A is a perspective view showing an NE sensor according to the embodiment.
Figure 2B:
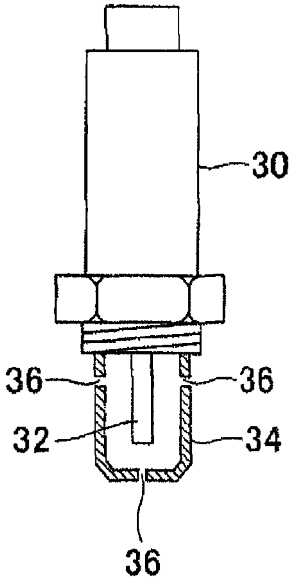
FIG. 2B is a partial cross-sectional view showing a sensor section of the A/F sensor according to the embodiment.

As shown in the A/F sensor 30 of FIGS. 2A and 2B, a cover 34 in the shape of a cylinder having a bottom covers a periphery of a sensor element 32. The sensor element 32 is a laminated-type sensor element, in which plate-like solid electrolyte bodies are stacked, for example.

The cover 34 prevents the sensor element 32 from getting wet from condensate water or dew condensation water generated in the exhaust gas flow passage 210. Multiple vent holes 36 are formed in the cover 34 to penetrate through a peripheral wall and a bottom wall of the cover 34, thereby allowing the exhaust gas to flow to the inside of the cover 34 and to flow out of the cover 34.

The ECU 40 is constituted mainly by a microcomputer having CPU, RAM, ROM, a rewritable storage device such as a flash memory and the like (not shown). The CPU executes control programs stored in the storage devices such as the ROM and the flash memory of the ECU 40. Thus, the ECU 40 controls the engine operation state and diagnoses a degree of lowering of response of the A/F sensor 30.

The ECU 40 obtains an engine operation state from output signals of the various sensors such as the A/F sensor 30, an intake air temperature sensor (Ta sensor), the intake quantity sensor (Qa sensor), an engine rotation speed sensor (NE sensor) and an accelerator position sensor (ACCP sensor), which are not illustrated in the drawings. The ECU 40 controls injection timing and injection quantity of the injector 4 based on the obtained engine operation state. The ECU 40 performs multi-stage injection consisting of a main injection for generating a main part of engine torque, a pilot injection before the main injection, a post-injection after the main injection and the like based on the engine operation state.

The pilot injection is performed to premix the air and small quantity of the fuel before ignition caused by the main injection. The post-injection is performed to inject small quantity of the fuel, thereby combusting the particulate matters collected in the DPF 22.

(Response of A/F Sensor 30)

Next, the response of the A/F sensor 30 will be explained. For example, if an accelerator pedal is released in a constant speed running state to cause a deceleration operation state, the ECU 40 cuts the fuel injection from the injector 4 as shown in part (A) of FIG. 3. If the injection quantity 300 becomes 0 due to the fuel cut, the combustion does not arise in the cylinder of the engine 2. Therefore, the oxygen concentration 310 in the cylinder of the engine 2 increases to an equivalent of an atmosphere in a manner of step response and converges to the equivalent of the atmosphere without overshooting as shown in parts (B) and (C) of FIG. 3.

There is a delay until the gas in the cylinder reaches the A/F sensor 30 because of pipe length and the like. Therefore, the oxygen concentration at the position where the A/F sensor 30 is arranged changes in retard of the change of the oxygen concentration 310 in the cylinder. The delay in the change varies depending on flow velocity of the exhaust gas. The flow velocity of the exhaust gas changes with the engine operation state defined by the parameters such as the engine rotation speed NE, the fuel injection quantity and the intake quantity Qa. Therefore, the delay in the change of the oxygen concentration occurring at the position where the A/F sensor 30 is arranged in retard of the change in the oxygen concentration 310 in the cylinder can be calculated and estimated based on the engine operation state.

Figure 3:
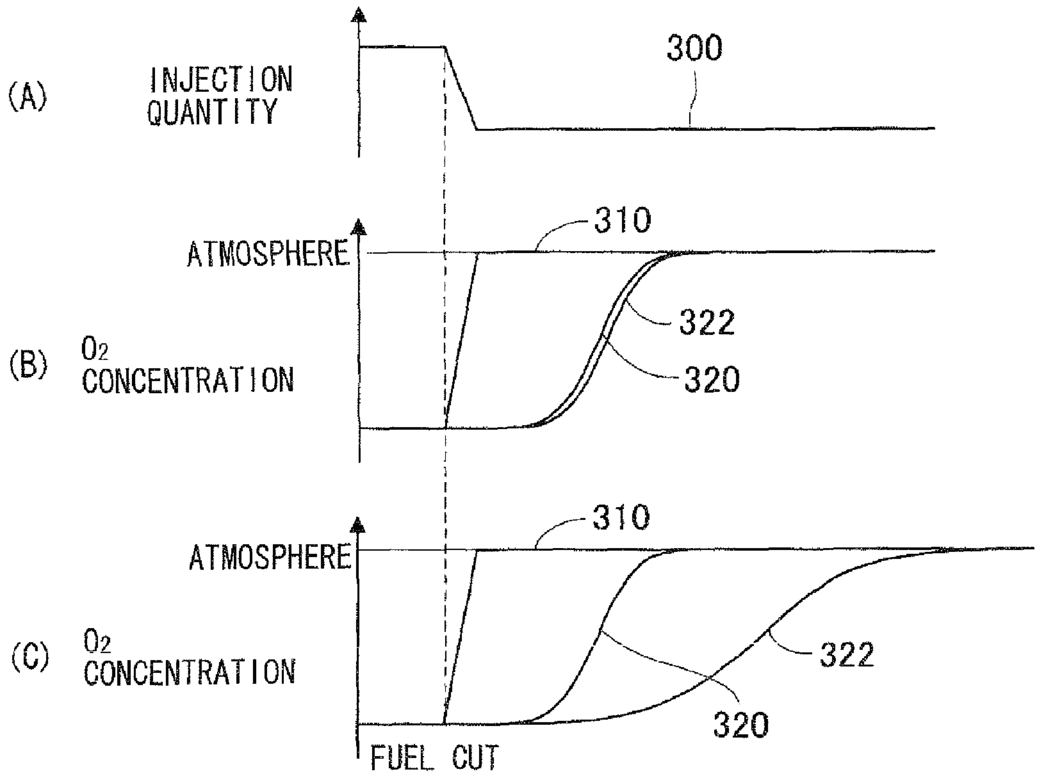
FIG. 3 is a time chart showing a relationship between a normal output and an actual output during fuel cut.

If the response of the A/F sensor 30 is normal, the normal output 320 estimated based on the engine operation state and the actual output 322 of the A/F sensor 30 should show substantially the same response to the oxygen concentration 310 in the cylinder as shown in part (B) of FIG. 3.

If the particulate matters plug the vent holes 36 of the A/F sensor 30 or the sensor element 32 degrades, the response of the actual output 322 falls below the response of the normal output 320 as shown in part (C) of FIG. 3.

As shown in FIG. 3, a magnitude relationship between the normal output 320 and the actual output 322 and magnitude of deviation therebetween can be sensed by comparing the response of the actual output 322 with only the normal output 320. However, since the actual output 322 is compared with the only one comparison object that is the normal output 320, a lowering degree of the response of the actual output 322 cannot be determined.

Figure 4:
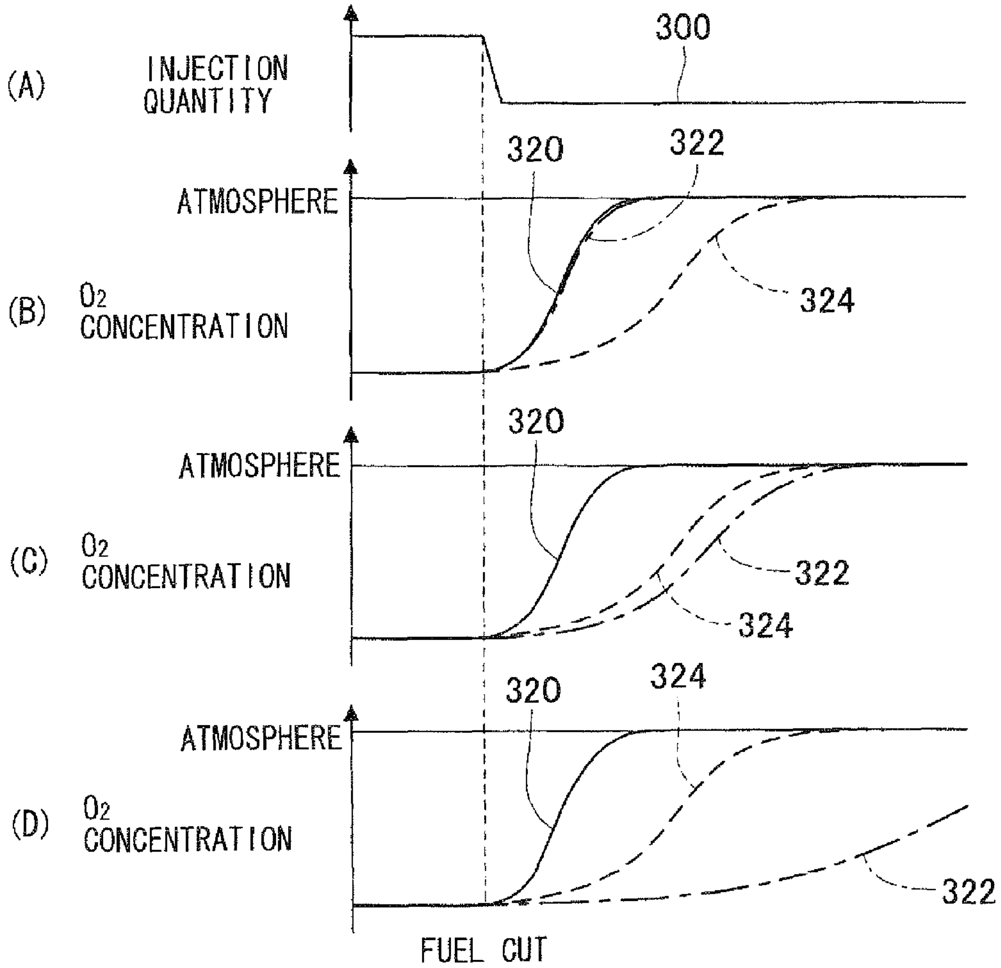
FIG. 4 is a time chart showing various lowering degrees of response of an actual output according to the embodiment.

Therefore, in the present embodiment, in order to diagnose the response of the A/F sensor 30, a lowered output 324 is estimated in addition to the normal output 320 as shown in FIG. 4. The lowered output 324 is defined as an output value having the response lowered from the response of the normal output 320 by a predetermined value.

The normal output 320 is estimated by using the oxygen concentration in the cylinder, the time necessary for the exhaust gas to reach from the cylinder to the position where the A/F sensor 30 is arranged, and a response characteristic of the normal A/F sensor 30 as parameters. The oxygen concentration in the cylinder is calculated based on the intake quantity Qa, the injection quantity, the EGR gas quantity and the like.

For example, the lowered output 324 is estimated by using the response characteristic of the A/F sensor having the response lowered by a predetermined value in place of the response characteristic of the normal A/F sensor used when the normal output 320 is estimated. For example, the delay in the response of the lowered output 324 is set to be five times longer than the delay in the response of the normal output 320.

Alternatively, the lowered output 324 may be estimated by applying first-order lag processing to the normal output 320.

In part (B) of FIG. 4, the actual output 322 is substantially equal to the normal output 320 and is largely separated from the lowered output 324 toward the normal output side. Therefore, it can be diagnosed that the lowering degree of the response of the actual output 322 is small with respect to the normal output 320.

In part (C) of FIG. 4, the actual output 322 is closer to the lowered output 324 than to the normal output 320 and is largely separated from the normal output 320. Therefore, it can be diagnosed that the lowering degree of the response of the actual output 322 is large with respect to the normal output 320.

In part (D) of FIG. 4, the response of the actual output 322 has lowered further than the response of the lowered output 324. It can be diagnosed that the lowering degree of the response of the actual output 322 is significantly large (maximized) with respect to the normal output 320 based on the degree of the separation of the actual output 322 from both of the normal output 320 and the lowered output 324.

Thus, the lowering degree of the response of the actual output 322 with respect to the normal output 320 can be diagnosed by comparing the actual output 322 with both of the normal output 320 and the lowered output 324, as contrasted to the case where the actual output 322 is compared with only either one of the normal output 320 and the lowered output 324.

(Diagnosis Based on Integration)

Next, the diagnosis of the lowering degree of the response of the actual output 322 will be explained in more detail.

Figure 5:
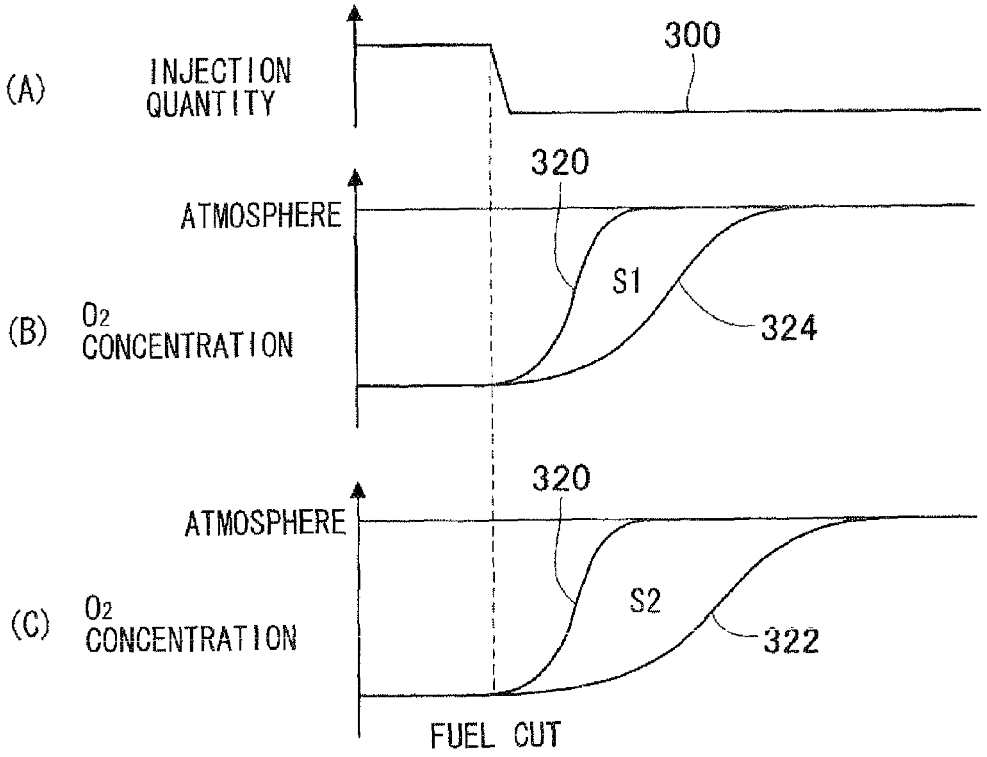
FIG. 5 is a time chart showing integration of deviations among a normal output, a lowered output and the actual output according to the embodiment.

In FIG. 5, an integration value S1 of the deviation between the normal output 320 and the lowered output 324 and an integration value S2 of the deviation between the normal output 320 and the actual output 322 are calculated respectively since the engine operation state shifts from the steady state to the transient state due to the fuel cut until the lowered output 324 and the actual output 322 converge. The lowering degree of the response of the actual output 322 is diagnosed based on a value S2/S1. Alternatively, an integration value of a deviation between the lowered output 324 and the actual output 322 may be calculated as S2 in place of the deviation between the normal output 320 and the actual output 322.

If the response of the A/F sensor 30 is normal and the actual output 322 substantially coincides with the normal output 320, S2 is approximately 0. Therefore, S2/S1 is approximately 0. When the actual output 322 is substantially equal to the lowered output 324, S2/S1 is approximately 1. Therefore, the lowering degree of the A/F sensor 30 can be diagnosed based on S2/S1.

(First Diagnostic Routine)

Figure 6:
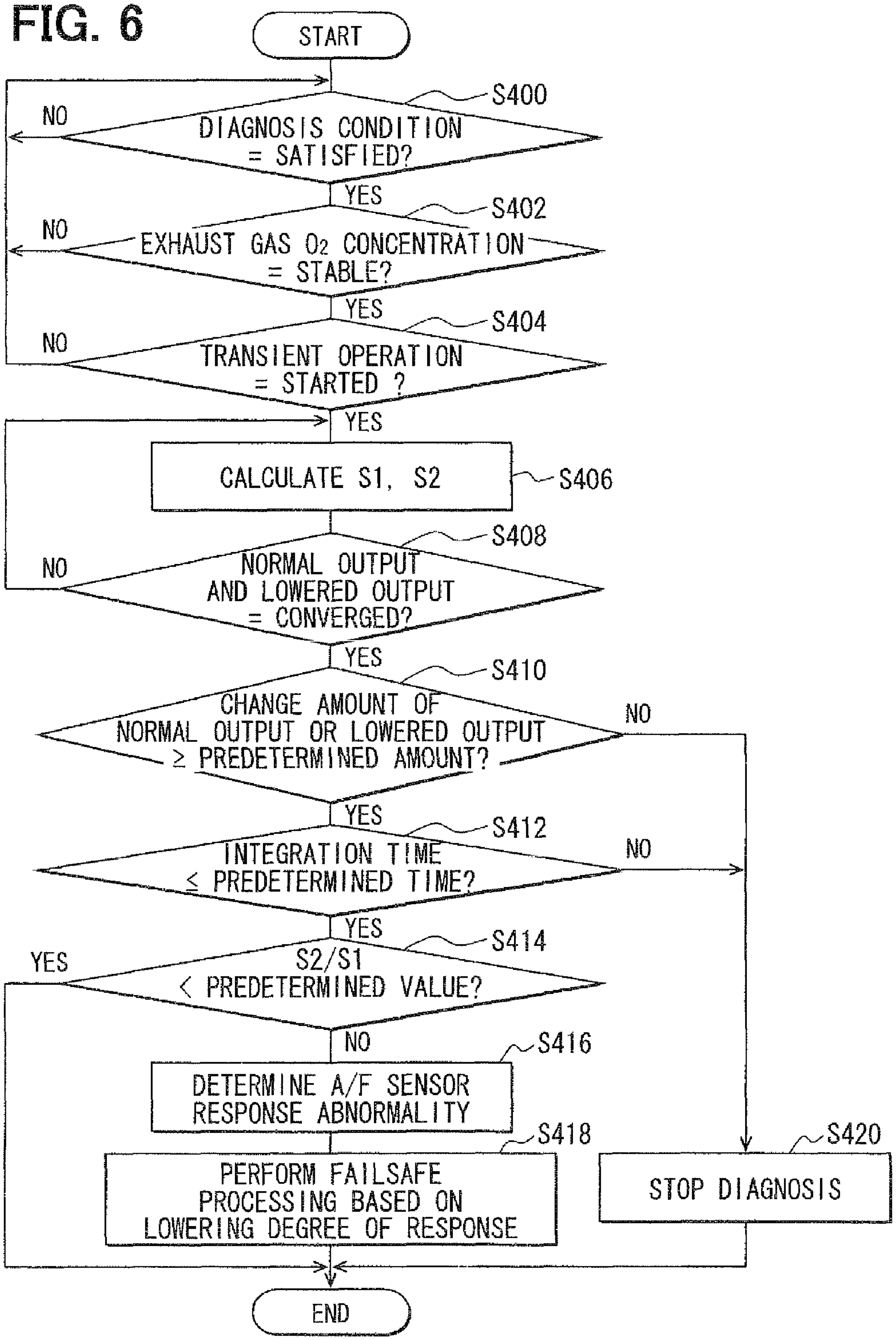
FIG. 6 is a flowchart showing response diagnosis based on the integration of the deviation according to the embodiment.

FIG. 6 shows a first response diagnostic routine of the A/F sensor 30 based on the integration of the deviation. The first diagnostic routine of FIG. 6 is performed invariably.

In S400 (S means "Step"), the ECU 40 determines whether a diagnosis condition is satisfied. If at least one of following conditions (i) to (iii) is satisfied (S400: NO), the ECU 40 determines that the diagnosis condition is not satisfied and does not perform the response diagnosis.

(i) The A/F sensor 30 is abnormal. For example, the output of the A/F sensor 30 is fixed and does not change.

(ii) A predetermined time has not elapsed after the A/F sensor 30 is warmed and the output of the A/F sensor 30 is unstable.

(iii) The post-injection is performed or the fuel addition from the fuel addition valve is performed for the regeneration of the DPF 22, whereby the exhaust gas state is unstable due to the oxidation reaction in the DOC 20, and quantity of unburned components in the exhaust gas changes.

If the diagnosis condition is satisfied (S400: YES), the ECU 40 determines whether the exhaust gas oxygen concentration is constant and stable, i.e., whether the engine operation state is the steady state, in S402.

When the exhaust gas oxygen concentration is constant and stable and the engine operation state is the steady state (S402: YES), the normal output 320 and the lowered output 324 should coincide with the actual output 322. Therefore, when the engine operation state is the steady state (S402: YES), it is desirable to correct the estimates of the normal output 320 and the lowered output 324 such that the estimates coincide with the sensing value of the actual output 322. Thus, the deviations among the normal output 320, the lowered output 324 and the actual output 322 can be removed before the calculation of the integration value S1, S2 in S406, whereby the integration values S1, S2 can be calculated with high accuracy.

When the exhaust gas oxygen concentration is stable (S402: YES), the ECU 40 determines whether the engine operation state has shifted to the transient state in S404. This determination is performed based on change in the accelerator position ACCP or the like, for example.

If the engine operation state shifts to the transient state (S404: YES), the ECU 40 calculates the integration value S1 of the deviation between the normal output 320 and the lowered output 324 and the integration value S2 of the deviation between the normal output 320 and the actual output 322 until the engine operation state shifts from the transient state to the steady state and both of the normal output 320 and the lowered output 324 converge.

The ECU 40 ends the calculation of the integration values S1, S2 when the engine operation state shifts from the transient state to the steady state and both of the normal output 320 and the lowered output 324 converge (S408: YES). In S410, the ECU 40 determines whether a change amount of the normal output 320 or the lowered output 324 generated during the calculation of the integration values S1, S2 is equal to or larger than a predetermined amount.

When the change amount of the normal output 320 or the lowered output 324 is smaller than the predetermined amount (S410: NO), the ECU 40 determines that the integration values S1, S2 are small and are susceptible to measurement errors since the change amount of the normal output 320 or the lowered output 324 is small. Therefore, the ECU 40 determines that the lowering degree of the response of the A/F 30 cannot be diagnosed based on the integration value S1, S2. In this case, the ECU 40 stops the diagnosis of the A/F sensor 30 in S420 and ends the present routine. Thus, erroneous diagnosis of the lowering degree of the response of the A/F sensor 30 can be prevented.

For example, it is determined in S410 that the change amount of the normal output 320 or the lowered output 324 is smaller than the predetermined amount when the exhaust gas becomes the equivalent of the atmosphere due to execution of the fuel cut in the case where the values of the normal output 320 and the lowered output 324 before the fuel cut were close to the oxygen concentration of the atmosphere.

When the change amount of the normal output 320 or the lowered output 324 is equal to or larger than the predetermined amount (S410: YES), the ECU 40 determines whether an integration time is equal to or shorter than a predetermined time in S412. In the case where the integration time is longer than the predetermined time, an error tends to occur in the integration values S1, S2 if the integration values S1, S2 are calculated over the predetermined time in a state where a noise is caused in the normal output 320, the lowered output 324 and the actual output 322. Therefore, in such the case, the ECU 40 determines that the lowering degree of the response of the A/F 30 cannot be diagnosed based on such the integration values S1, S2. Then, the ECU 40 stops the diagnosis of the A/F sensor 30 in S420 and ends the present routine. Thus, erroneous diagnosis of the lowering degree of the response of the A/F sensor 30 can be prevented.

The condition for stopping the diagnosis of the A/F sensor 30 in S410 or S412 includes a case where a time of injection quantity change (i.e., deceleration or acceleration) exceeds a predetermined time and a case where an injection quantity change rate is equal to or smaller than a predetermined value.

When the integration time is equal to or shorter than the predetermined time (S412: YES), the ECU 40 compares the value S2/S1 with a predetermined value in S414. As mentioned above, the integration value S1 is the integration value of the deviation between the normal output 320 and the lowered output 324. The integration value S2 is the integration value of the deviation between the normal output 320 and the actual output 322. Therefore, the lowering degree of the response of the actual output 322 can be diagnosed based on the value S2/S1.

If the value S2/S1 is smaller than the predetermined value (S414: YES), the ECU 40 determines that the response of the A/F sensor 30 is not abnormal and ends the present routine. The predetermined value to be compared with the value S2/S1 to determine whether the response of the A/F sensor 30 is abnormal is set at 1, for example.

When the value S2/S1 is smaller than the predetermined value (S414: YES) and the ECU 40 determines that the response of the A/F sensor 30 is not abnormal and ends the present routine, the ECU 40 performs suitable engine control in a usual engine control routine based on the value S2/S1, i.e., based on the lowering degree of the response of the A/F sensor 30.

For example, when the lowering degree of the response of the A/F sensor 30 is small, the normal output 320 is corrected based on the deviation between the normal output 320 and the actual output 322. When the value S2/S1 is smaller than the predetermined value but the lowering degree of the response of the A/F sensor 30 is large, the timing for correcting the normal output 320 based on the deviation between the normal output 320 and the actual output 322 is limited to the timing when the engine operation state is stable.

If the value S2/S1 is equal to or larger than the predetermined value (S414: NO), the ECU 40 determines that the response of the A/F sensor 30 is abnormal in S416. Then, the ECU 40 performs suitable failsafe processing in S418 based on the lowering degree of the response and then ends the present routine. As the failsafe processing in this case, the abnormality of the A/F sensor 30 is notified by a warning light or the engine control based on the output of the A/F sensor 30 is stopped, for example.

According to the above-described diagnosis of the response based on the integration of the deviation, even if noises arise in the outputs of the various sensors for sensing the engine operation state or even if a noise arises in the output of the A/F sensor 30 when the normal output 320 and the lowered output 324 are estimated based on the engine operation state, the influence of the errors in the integration values due to the noises is small. Therefore, the lowering degree of the response of the A/F sensor 30 can be diagnosed with high accuracy based on the value S2/S1 using the calculated integration values S1, S2.

An influence of disturbance can be eliminated as much as possible by performing the diagnosis of the response based on the integration of the deviation during the fuel cut. Further, the oxygen concentration in the exhaust gas flow passage 210 increases to the equivalent of the atmosphere in the step response manner and converges to the equivalent of the atmosphere without overshooting. Therefore, the normal output 320 and the lowered output 324 of the A/F sensor 30 can be estimated with high accuracy. As a result, the lowering degree of the response of the A/F sensor 30 can be diagnosed with high accuracy based on the value S2/S1.

If the state where the fuel injection quantity changes and the gas state including the oxygen concentration changes in the step response manner is caused by compulsorily increasing or decreasing the fuel injection quantity irrespective of the engine operation state as in the fuel cut, torque fluctuation is caused by the increase or decrease of the fuel injection quantity in the diesel engine 2, thereby giving discomfort to a driver. Furthermore, there is a possibility that increase of a combustion sound and deterioration of emission are caused. As contrasted thereto, the fuel cut accompanying the accelerator operation can change the gas state including the oxygen concentration in the step response manner without giving the discomfort to the driver and without causing the increase of the combustion sound and the deterioration of the emission.

During the fuel cut, the influence of the disturbance on the exhaust gas is small and the components of the exhaust gas can be specified to be equivalents of the atmosphere. Therefore, normal outputs and lowered outputs of other exhaust gas sensors than the A/F sensor 30 can be also estimated with high accuracy. As a result, lowering degrees of responses of the exhaust gas sensors can be diagnosed with high accuracy.

The gas state including the oxygen concentration in the exhaust gas flow passage 210 becomes the equivalent of the atmosphere during the fuel cut. Therefore, for example, concerning the A/F sensor 30, the actual output 322 can be corrected such that the oxygen concentration equivalent to the atmosphere and the sensing value of the actual output 322 coincide with each other.

When a phenomenon that enlarges the fluctuation of the gas state in the exhaust gas flow passage 210 arises as illustrated below ((a) to (d)) during the execution of the first diagnostic routine, it is determined that the diagnosis of the lowering degree of the response of the A/F sensor 30 is difficult, and the execution of the first diagnostic routine is stopped. This is the same also in second and third diagnostic routines explained later.

(a) The deceleration or the acceleration of two or more steps is performed.

(b) Brake operation, shift change or clutch disengagement is performed.

(c) The change amount of the engine rotation speed NE or the intake quantity Qa is equal to or larger than a predetermined value.

(d) Overshoot or undershoot occurs when the oxygen concentration converges in the case where the response of the A/F sensor 30 is diagnosed in a transient state other than the fuel cut.

(Diagnosis Based on Change Rate)

Figure 7:
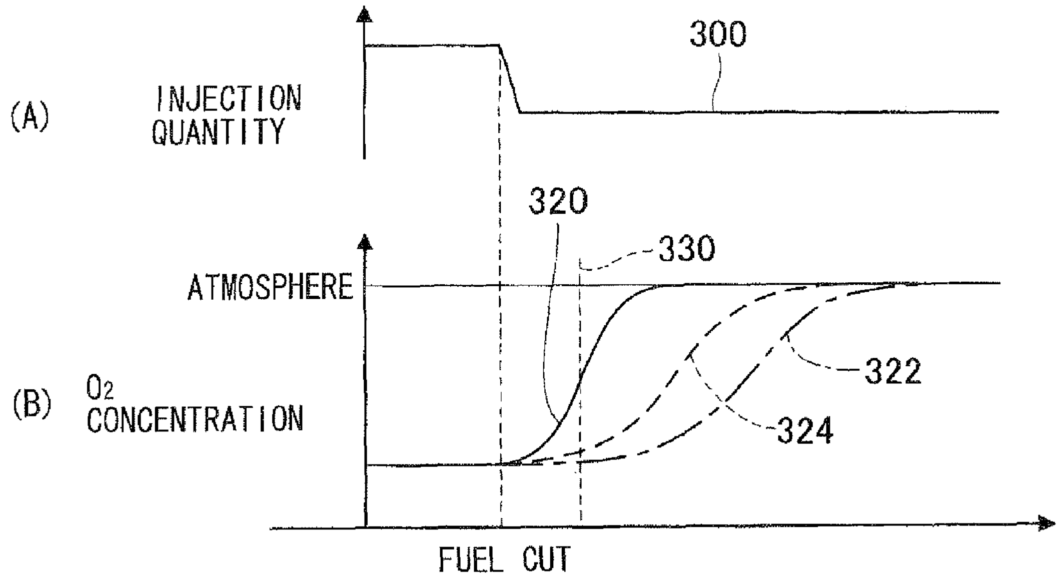
FIG. 7 is a time chart showing differences among change rates of the normal output, the lowered output and the actual output according to the embodiment.

In place of the diagnosis based on the integration, change rates of the normal output 320, the lowered output 324 and the actual output 322 at predetermined timing 330 are calculated in FIG. 7. The lowering degree of the response of the actual output 322 is diagnosed by comparing the change rates.

When the response of the A/F sensor 30 is normal and the response of the actual output 322 substantially coincides with the response of the normal output 320, the change rate of the actual output 322 substantially coincides with the change rate of the normal output 320 at predetermined timing in the transient state. When the response of the actual output 322 has lowered as compared to the response of the normal output 320, the change rates of the normal output 320, the lowered output 324 and the actual output 322 are different at predetermined timing in the transient state.

The change rate of the output changes during the transient state. Therefore, the magnitude relationship among the change rates of the normal output 320, the lowered output 324 and the actual output 322 having the different responses is not the same at all the timings during the transient state. However, the lowering degree of the response of the A/F sensor 30 can be diagnosed by comparing the magnitude relationships of the change rates of the normal output 320, the lowered output 324 and the actual output 322.

(Second Diagnostic Routine)

Figure 8:
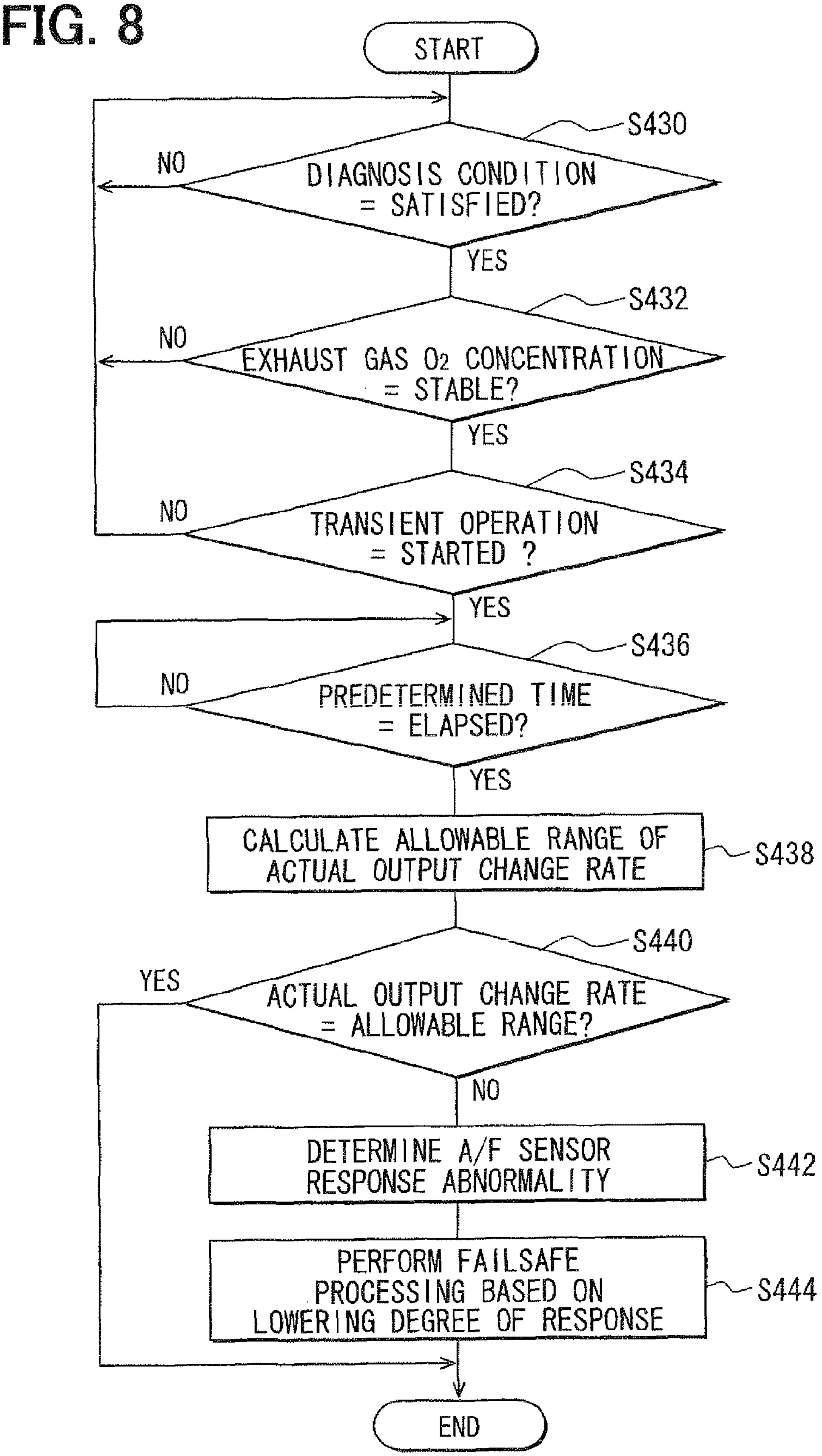
FIG. 8 is a flowchart showing response diagnosis based on the difference in the change rates according to the embodiment.

FIG. 8 shows the second response diagnostic routine of the A/F sensor 30 based on the change rate. The second diagnostic routine of FIG. 8 is executed invariably. Processing of S430 to S434 of FIG. 8 is substantially the same as the processing of S400 to S404 of FIG. 6.

If a predetermined time elapses after the engine 2 starts the transient operation (S436: YES), the ECU 40 calculates the change rates of the normal output 320, the lowered output 324 and the actual output 322 at predetermined timing when the predetermined time elapses in S438. The ECU 40 calculates an allowable range of the change rate of the actual output 322, in which the response of the A/F sensor 30 can be determined to be normal, from the change rates of the normal output 320 and the lowered output 324.

When the change rate of the actual output 322 is outside the allowable range (S440: NO), the ECU 40 determines that the response of the A/F sensor 30 is abnormal in S442. Then, the ECU 40 performs suitable failsafe processing in S444 based on the change rates of the normal output 320, the lowered output 324 and the actual output 322, i.e., based on the lowering degree of the response. Then, the ECU 40 ends the present routine.

If the change rate of the actual output is within the allowable range (S440: YES), the ECU 40 determines that the response of the A/F sensor 30 is normal and ends the present routine. In this case, the ECU 40 performs suitable engine control in the usual engine control routine based on the change rates of the normal output 320, the lowered output 324 and the actual output 322, i.e., based on the lowering degree of the response of the A/F sensor 30.

(Diagnosis Based on Maximum Change Rate)

Figure 9:
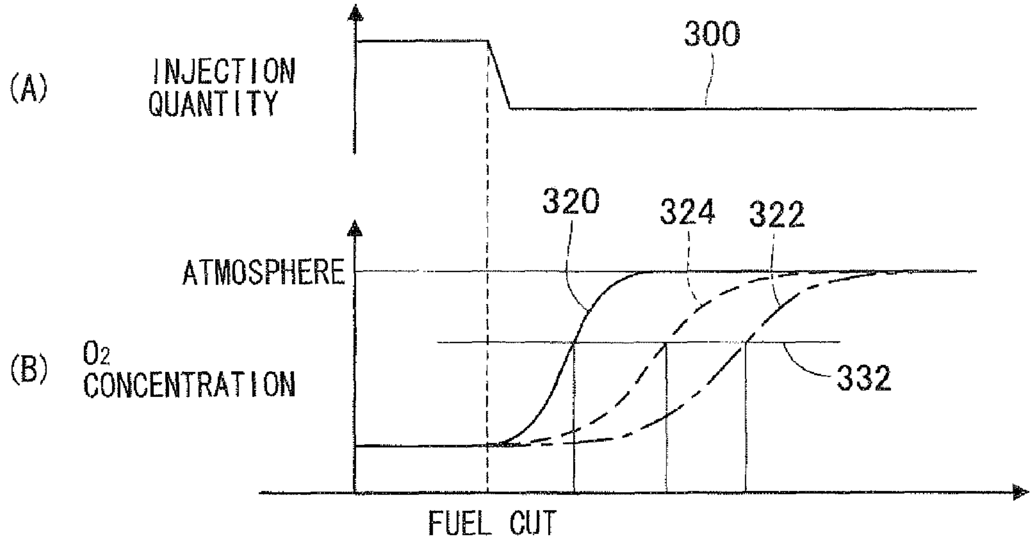
FIG. 9 is a time chart showing differences among timings of the maximum change rates of the normal output, the lowered output and the actual output according to the embodiment.

In place of the diagnosis based on the integration, timings when the change rates of the normal output 320, the lowered output 324 and the actual output 322 are maximized (i.e., points 332 in FIG. 9) are detected in FIG. 9. The lowering degree of the response of the actual output 322 is diagnosed by comparing the timings where the change rates are maximized. As shown in FIG. 9, the timing when the change rate is maximized delays more as the response lowers. Therefore, the lowering degree of the response of the A/F sensor 30 can be diagnosed by comparing the timings when the change rates of the normal output 320, the lowered output 324 and the actual output 322 are maximized.

(Third Diagnostic Routine)

Figure 10:
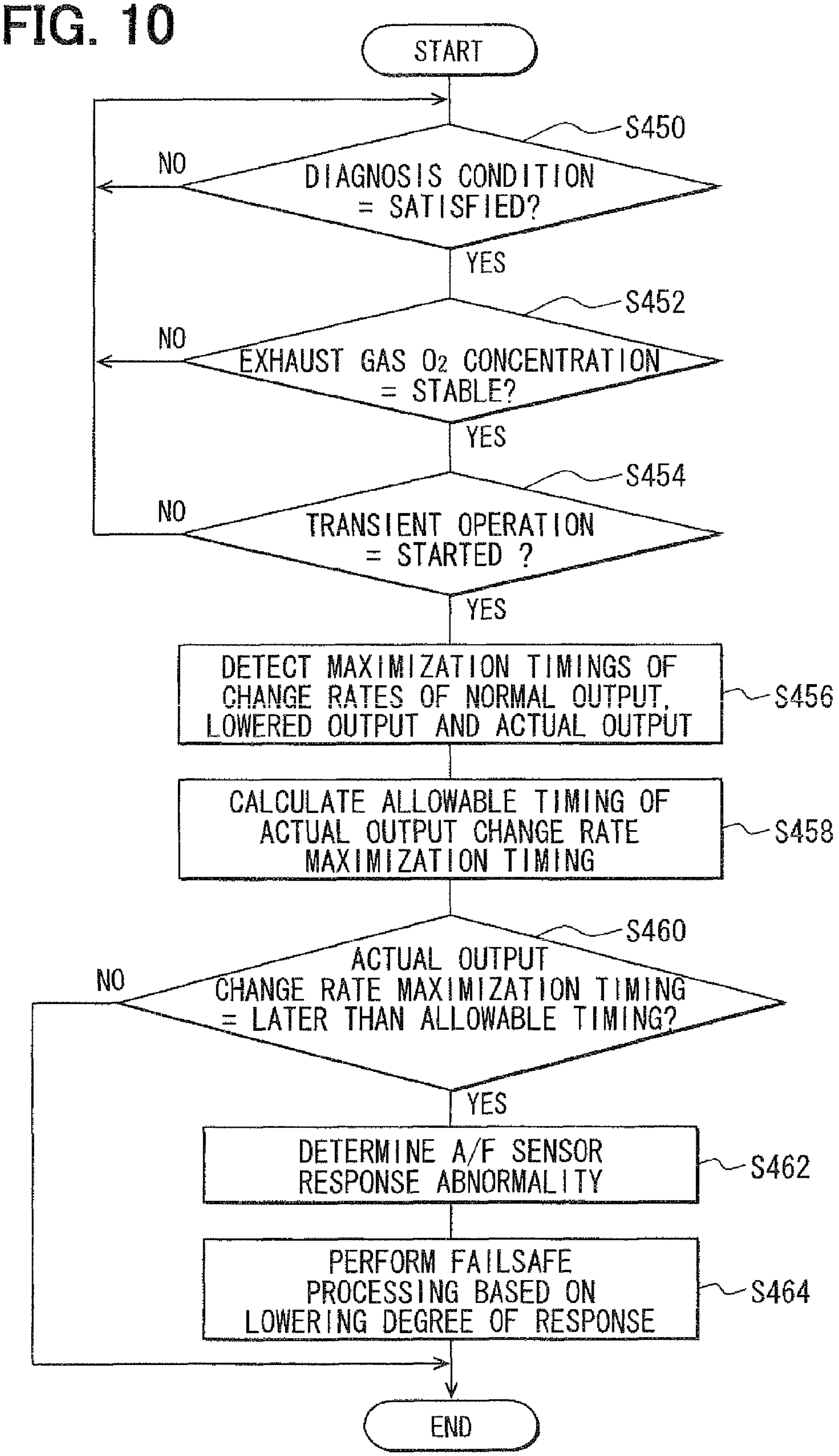
FIG. 10 is a flowchart showing response diagnosis based on the difference in the timings of the maximum change rates according to the embodiment.

FIG. 10 shows the third response diagnostic routine of the A/F sensor 30 based on the timing when the change rate is maximized. The third diagnostic routine of FIG. 10 is executed invariably. Processing of S450 to S454 of FIG. 10 is substantially the same as the processing of S400 to S404 of FIG. 6.

If the engine 2 starts the transient operation (S454: YES), the ECU 40 detects the timings when the change rates of the normal output 320, the lowered output 324 and the actual output 322 are maximized in S456. In S458, the ECU 40 calculates allowable timing of the maximization timing of the change rate of the actual output 322 from the maximization timings of the change rates of the normal output 320 and the lowered output 324. The allowable timing is timing, at which the response of the A/F sensor 30 can be determined to be normal.

If the ECU 40 determines in S460 that the maximization timing of the change rate of the actual output 322 is later than the allowable timing (S460: YES), the ECU 40 determines that the response of the A/F sensor 30 is abnormal in S462. Then, the ECU 40 performs suitable failsafe processing in S464 based on the maximization timings of the change rates of the normal output 320, the lowered output 324 and the actual output 322, i.e., based on the lowering degree of the response. Then, the ECU 40 ends the present routine.

If the maximization timing of the change rate of the actual output 322 is equal to or earlier than the allowable timing (S460: NO), the ECU 40 determines that the response of the A/F sensor 30 is normal and ends the present routine. In this case, the ECU 40 performs suitable engine control in the usual engine control routine based on the maximization timings of the change rates of the normal output 320, the lowered output 324 and the actual output 322, i.e., based on the lowering degree of the response of the A/F sensor 30.

In the present embodiment, the ECU 40 corresponds to the exhaust gas sensor diagnostic device of the present invention, and the A/F sensor 30 corresponds to the exhaust gas sensor. The processing of S406 of FIG. 6 corresponds to the functions of the normal output estimating section, the lowered output estimating section and the actual output sensing section of the present invention. The processing of S404 to S408 corresponds to the function of the integrating section. The processing of S400, S410 to S416 and S420 corresponds to the function of the diagnosing section.

In the present embodiment, S438 of FIG. 8 corresponds to the functions of the normal output estimating section, the lowered output estimating section, the actual output sensing section and the change rate calculating section of the present invention. The processing of S430 and S438 to S442 corresponds to the function of the diagnosing section.

In the present embodiment, S456 of FIG. 10 corresponds to the functions of the normal output estimating section, the lowered output estimating section, the actual output sensing section and the timing calculating section of the present invention. The processing of S450 and S458 to S462 corresponds to the function of the diagnosing section.

In the above-described embodiment, the normal output 320 of the A/F sensor 30 having the normal response, the lowered output 324 having the response lowered by the predetermined value as compared to the normal output 320 and the actual output 322 of the A/F sensor 30 are compared with each other. Thus, not only the magnitude relationship between either one of the normal output 320 and the lowered output 324 and the actual output 322 but also the lowering degree of the response of the A/F sensor 30 can be diagnosed.

OTHER EMBODIMENTS

In the above-described embodiment, the A/F sensor 30 for sensing the oxygen concentration in the exhaust gas flow passage 210 is used as the exhaust gas sensor. The exhaust gas sensor diagnostic device of the present invention may be used to diagnose response of any kind of an exhaust gas sensor such as a NOx sensor for sensing a NOx concentration in the exhaust gas flow passage 210, an exhaust gas temperature sensor for sensing exhaust gas temperature and a PM sensor for sensing quantity of the particulate matters in the exhaust gas in addition to the A/F sensor 30 if the exhaust gas sensor senses the gas state in the exhaust gas flow passage 210.

In the above-described embodiment, the lowering degree of the response of the A/F sensor 30 as the exhaust gas sensor is diagnosed based on the gas state in the exhaust gas flow passage 210 during the deceleration operation caused by the fuel cut. Alternatively, the lowering degree of the response of the exhaust gas sensor may be diagnosed based on the gas state in the exhaust gas flow passage 210 during the acceleration operation.

In the above-described embodiment, the functions of the normal output estimating section (NOE), the lowered output estimating section (LOE), the actual output sensing section (AOS), the diagnosing section (D), the integrating section (I), the change rate calculating section (CRC) and the timing calculating section (TC) are realized by the ECU 40 (see FIG. 1), whose function is specified by the control programs. Alternatively, at least a part of the functions of the above-described multiple sections may be realized with hardware, whose function is specified by its circuit configuration.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An exhaust gas sensor diagnostic device that diagnoses response of an exhaust gas sensor, which is provided to an exhaust gas flow passage of an internal combustion engine and which senses a gas state in the exhaust gas flow passage, the exhaust gas sensor diagnostic device comprising:

a normal output estimating means for estimating a normal output of the exhaust gas sensor having normal response based on an operation state of the internal combustion engine;

a lowered output estimating means for estimating a lowered output of the exhaust gas sensor having the response lowered by a predetermined value as compared to the exhaust gas sensor having normal response;

an actual output sensing means for sensing an actual output of the exhaust gas sensor provided to the exhaust gas flow passage;

an integrating means for calculating S1, which represents an integration value of a deviation between the normal output and the lowered output, and S2, which represents an integration value of a deviation between the actual output and the normal output or the lowered output; and a diagnosing means for diagnosing the response of the exhaust gas sensor based on S1 and S2.

2. The exhaust gas sensor diagnostic device as in claim 1, wherein the normal output estimating means estimates the normal output based on a gas state in a cylinder estimated from the operation state of the internal combustion engine, time necessary for the exhaust gas to reach from the cylinder to the exhaust gas sensor and a response characteristic of the exhaust gas sensor having normal response.

3. The exhaust gas sensor diagnostic device as in claim 1, wherein the normal output estimating means estimates the normal output based on parameters including at least a response characteristic of the exhaust gas sensor having normal response, and the lowered output estimating means estimates the lowered output based on the parameters used in estimating the normal output by the normal output estimating means, except that in place of the response characteristic of the exhaust gas sensor having normal response, the parameters used in estimating the lowered output include a response characteristic of the exhaust gas sensor having the response lowered by the predetermined value as compared to the response characteristic of the exhaust gas sensor having normal response.

4. The exhaust gas sensor diagnostic device as in claim 1, wherein the lowered output estimating means estimates the lowered output by applying first-order lag processing to the normal output estimated by the normal output estimating means.

5. The exhaust gas sensor diagnostic device as in claim 1, wherein the integrating means ends the calculation of S1 and S2 when the normal output, the lowered output and the actual output change after the calculation of S1 and S2 is started and at least one of the lowered output and the normal output converges thereafter.

6. The exhaust gas sensor diagnostic device as in claim 1, wherein the integrating means starts the calculation of S1 and S2 when the normal output, the lowered output and the actual output are equal to each other.

7. The exhaust gas sensor diagnostic device as in claim 1, wherein the integrating means starts the calculation of S1 and S2 when the operation state of the internal combustion engine shifts from a steady state to a transient state.

8. The exhaust gas sensor diagnostic device as in claim 1, wherein the integrating means calculates S1 and S2 since the operation state of the internal combustion engine shifts from a steady state to a transient state until at least one of the lowered output and the normal output converges, and the diagnosing means stops the diagnosis of the response of the exhaust gas sensor if the time since the operation state of the internal combustion engine shifts from the steady state to the transient state until at least one of the lowered output and the normal output converges exceeds a predetermined time.

9. The exhaust gas sensor diagnostic device as in claim 1, wherein the integrating means calculates S1 and S2 since the operation state of the internal combustion engine shifts from the steady state to the transient state until at least one of the lowered output and the normal output converges, and the diagnosing means stops the diagnosis of the response of the exhaust gas sensor when a change amount of the converged one of the lowered output and the normal output, the change amount occurring in the period since the operation state of the internal combustion engine shifts from the steady state to the transient state until at least one of the lowered output and the normal output converges, is smaller than a predetermined amount.

10. The exhaust gas sensor diagnostic device as in claim 1, wherein the diagnosing means diagnoses the response of the exhaust gas sensor when the operation state of the internal combustion engine shifts to a fuel cut state.

11. The exhaust gas sensor diagnostic device as in claim 1, wherein the actual output sensing means corrects the actual output based on a gas state in a cylinder during fuel cut.

12. The exhaust gas sensor diagnostic device as in claim 1, wherein the normal output estimating means and the lowered output estimating means correct deviations of the normal output and the lowered output from the actual output when a gas state in a cylinder is a steady state.

13. The exhaust gas sensor diagnostic device as in claim 1, wherein the diagnosing means suspends the diagnosis of the response of the exhaust gas sensor when the exhaust gas sensor is warmed up until a predetermined time elapses thereafter.

14. An exhaust gas sensor diagnostic device that diagnoses response of an exhaust gas sensor, which is provided to an exhaust gas flow passage of an internal combustion engine and which senses a gas state in the exhaust gas flow passage, the exhaust gas sensor diagnostic device comprising:

a normal output estimating means for estimating a normal output of the exhaust gas sensor having normal response based on an operation state of the internal combustion engine;

a lowered output estimating means for estimating a lowered output of the exhaust gas sensor having the response lowered by a predetermined value as compared to the exhaust gas sensor having normal response;

an actual output sensing means for sensing an actual output of the exhaust gas sensor provided to the exhaust gas flow passage;

a change rate calculating means for calculating change rates of the normal output, the lowered output and the actual output at a same timing; and a diagnosing means for diagnosing the response of the exhaust gas sensor based on the change rates at the same timing calculated by the change rate calculating means.

15. An exhaust gas sensor diagnostic device that diagnoses response of an exhaust gas sensor, which is provided to an exhaust gas flow passage of an internal combustion engine and which senses a gas state in the exhaust gas flow passage, the exhaust gas sensor diagnostic device comprising:

a normal output estimating means for estimating a normal output of the exhaust gas sensor having normal response based on an operation state of the internal combustion engine;

a lowered output estimating means for estimating a lowered output of the exhaust gas sensor having the response lowered by a predetermined value as compared to the exhaust gas sensor having normal response;

an actual output sensing means for sensing an actual output of the exhaust gas sensor provided to the exhaust gas flow passage;

a timing calculating means for calculating timings at which change rates of the normal output, the lowered output and the actual output are maximized respectively; and a diagnosing means for diagnosing the response of the exhaust gas sensor based on the timings calculated by the timing calculating means.

* * * * *